United States Patent [19]
Gast et al.

[11] 4,275,586
[45] Jun. 30, 1981

[54] OSCILLATION SENSOR, PARTICULARLY COMBUSTION ENGINE KNOCK SENSOR

[75] Inventors: Theodor Gast, Berlin; Kurt Binder, Stuttgart, both of Fed. Rep. of Germany

[73] Assignee: Robert Bosch GmbH, Stuttgart, Fed. Rep. of Germany

[21] Appl. No.: 3,811

[22] Filed: Jan. 16, 1979

[30] Foreign Application Priority Data

Jan. 18, 1978 [DE] Fed. Rep. of Germany ....... 2801969

[51] Int. Cl.³ .............................................. G01L 23/22
[52] U.S. Cl. ............................................ 73/35; 73/651
[58] Field of Search ................... 73/35, 517 AV, 583, 73/593, 654, 660, DIG. 4, 65, 651; 310/329, 330, 332, 354

[56] References Cited

U.S. PATENT DOCUMENTS

| 1,948,104 | 2/1934 | Firestone et al. | 73/651 |
| 3,093,710 | 6/1963 | Ten Eyck | 310/330 |
| 3,113,223 | 12/1963 | Smith et al. | 310/329 |
| 3,393,557 | 7/1968 | Brown et al. | 73/35 X |
| 4,161,665 | 7/1979 | Buck et al. | 73/35 X |

FOREIGN PATENT DOCUMENTS

| 847071 | 8/1952 | Fed. Rep. of Germany | 73/651 |
| 973510 | 9/1950 | France | 73/651 |
| 537264 | 1/1977 | U.S.S.R. | 73/593 |

*Primary Examiner*—Charles A. Ruehl
*Attorney, Agent, or Firm*—Frishauf, Holtz, Goodman & Woodward

[57] ABSTRACT

In order to detect the occurrence of engine knock (pinging, detonation), a piezoelectric sensor is mounted on the engine in a location where the oscillations due to engine knock are readily transmitted. The detector is a strip or strips of piezoelectric material mounted in cantilevered configuration in a clamping device. An advantageous location for the sensor is a bore within one of the cylinder head bolts of the engine. A variety of embodiments is described including the provision of seals for permitting the introduction of a damping fluid in the receiver bore for the sensor.

17 Claims, 6 Drawing Figures

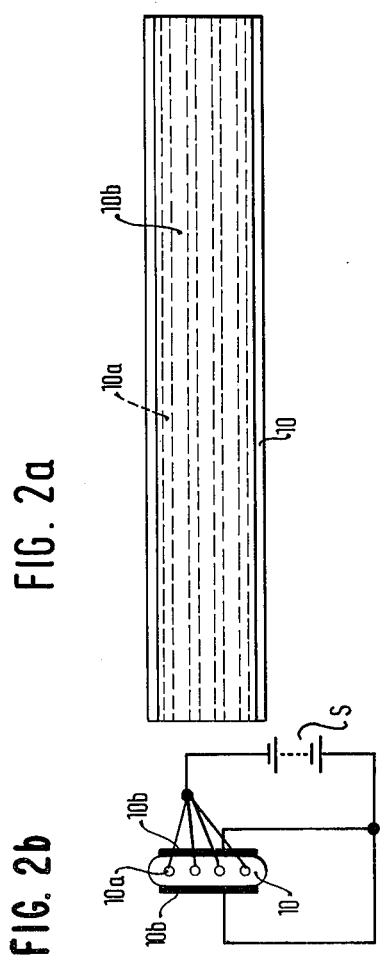

OSCILLATION SENSOR, PARTICULARLY COMBUSTION ENGINE KNOCK SENSOR

FIELD OF THE INVENTION

The invention relates to a sensor for detecting the oscillations and more particularly oscillations which occur when an internal combustion engine knocks or pings. The sensor may be a piezoelectric element which converts mechanical oscillations into an electrical signal.

BACKGROUND OF THE INVENTION

It is well known that under certain operational conditions and with certain fuels, gasoline powered internal combustion engines will exhibit a behavior called "knocking" or "pinging". These noises are audible oscillations generated by a shock wave in the compressed fuel-air mixture. It is an experimentally determined fact that the heat transfer to the piston and the cylinder walls of the engine is greatly increased during the occurrence of these oscillations and, as a result, these surfaces receive a detrimental thermal overload. Thus, any knocking in the engine is undesirable and should be prevented. It is desirable to be able to operate the engine within wide limits and as near as possible to the point of occurrence of engine knocking. Accordingly, it is useful to provide a sensor or detector which indicates the earliest occurrence of engine knocking reliably and early. Piezoelectric pressure indicators are known which are inserted into a special bore within the cylinder head of an internal combustion engine and which are in communication with the internal space of the cylinder. This manner of mounting a detector is difficult and expensive. Furthermore, the known sensors are broad-band detectors which respond to oscillations occurring over a wide range of frequencies. As a consequence, the desired signal which relates to engine knock and which occurs in a relatively narrow band of frequencies is hidden in a wide band of background noise. In order to use output signals of the known sensors, it is thus required to form the difference of the intensity at various times or to filter the generated signals. Both of these measures are relatively difficult and costly and the presence of additional circuitry tends to increase the sensitivity and failure probability of the entire apparatus.

THE INVENTION

Thus it is a principal object of the present invention to provide a sensor for detecting engine knocking which operates reliably and dependably and which may be easily installed at or on an internal combustion engine.

Briefly, according to the invention, a sensor is provided in the form of a cantilevered piezoelectric element one end of which is firmly mounted in a suitable clamping mechanism attached to the engine and which is so disposed that its widest area is perpendicular to the direction of propagation of the oscillations to be sensed.

The sensor can be so constructed as to permit selective response to the engine knocking noises and to reject extraneous signals unrelated thereto.

The effective response frequency of the sensor can be tuned at the time of installation.

BRIEF DESCRIPTION OF THE DRAWING

FIGS. 2a and 2b are side and end views respectively of the sensor of FIG. 2, and showing connections for its manufacture;

DETAILED DESCRIPTION OF THE INVENTION

Figure 1:
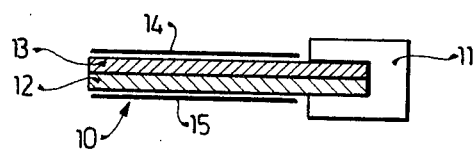
FIG. 1 is a sectional side view of a first exemplary embodiment of the invention.

FIG. 1:, a piezoelectric element 10 is installed as a cantilevered oscillator having one end fixedly clamped in a clamping device 11. The piezoelectric element is composed of two oppositely polarized strips 12 and 13 which may be joined by adhesive and which are provided with two external electrodes 14 and 15, respectively, between which an electrical signal is generated whenever the piezoelectric element 10 undergoes oscillations resulting in alternating tensile and compressive stresses. Due to the opposite electrical polarization of the strips 12 and 13, the voltage signals occurring on the electrodes 14 and 15 are in the same algebraic sense and are thus additive. The clamping mechanism 11 is U-shaped as shown and the piezoelectric element 10 is mounted therein, for example, with an adhesive. The clamping element 11 is rigidly attached to a part of the engine which tends to transmit the engine knock relatively well and the preferred orientation of the sensor is such that the plane of the piezoelectric element 10 lies transverse to the direction of propagation of the oscillations due to the engine knock.

Figure 2:
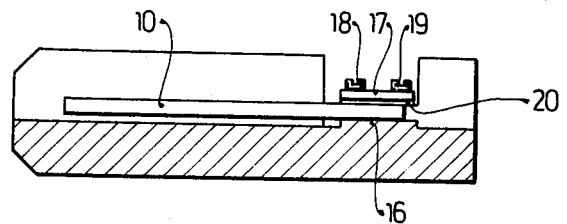
FIG. 2 is a sectional side view of a second exemplary embodiment of the invention.

FIG. 2 illustrates a second exemplary embodiment of the piezoelectric sensor according to the invention and its associated clamping mechanism. In this case, the piezoelectric element 10 is a flat rod with rounded sides and having longitudinal channels. The walls of these channels are metallized and are used as one electrode whereas the two coatings on the flatter sides of the rod are used as the opposite electrode. This construction produces a desired opposite polarization which imparts to the piezoelectric element 10 the desired sensitivity with respect to bending motions. FIG. 2a is a fragmentary view to an enlarged scale showing the metallized longitudinal channels 10a or grooves therein. The opposite directed polarization is obtained in the following way:

The two outer electrodes 10b are connected with one another and to one pole of a direct current source S, while the element is heated. The metal coated channels 10a are connected with one another and to the other pole of the source S. Thus, two domains of opposite polarization are formed, which after cooling, leave the desired residual pattern of polarization.

The piezoelectric element is clamped between two metal surfaces, the first metal surface 16 serving as a base and the other metal surface 17 being being a clamping plate which is clamped to the base 16 by means of screws 18 and 19. Clamped between the base 16 and the plate 17 is one end of the piezoelectric element 10. An insulating disc 20 made, for example, of mica or some type of temperature-resistant plastic is placed between the end of the element 10 and the clamping plate 17.

The entire device may be constructed in the form of a cylinder which may then be fitted into a suitable bore in the part of the engine in which the engine knock oscillations are to be sensed.

Figure 3:
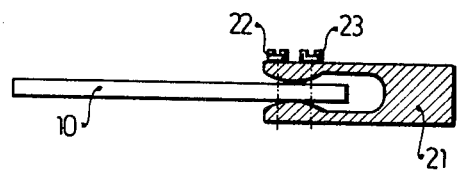
FIG. 3 is a sectional side view of a third embodiment of the invention.

FIG. 3 is an illustration of a third embodiment of the invention in which a piezoelectric element 10 is mounted in a clamping device 21 whose interior surfaces are rounded. One end of the sensor 10 is clamped between the rounded surfaces by clamping screws 22 and 23. It will be appreciated that the point of contact between the rounded surfaces of the clamp 21 and the strip 10, i.e., the oscillating node of the cantilevered beam, may be changed by differential tightening of the screws 22 and 23. In this manner, the effective oscillating length of the piezoelectric element 10 may be varied and a relatively simple adaptation of its resonant frequency to the frequency of the engine knock can thus be realized.

Figure 4:
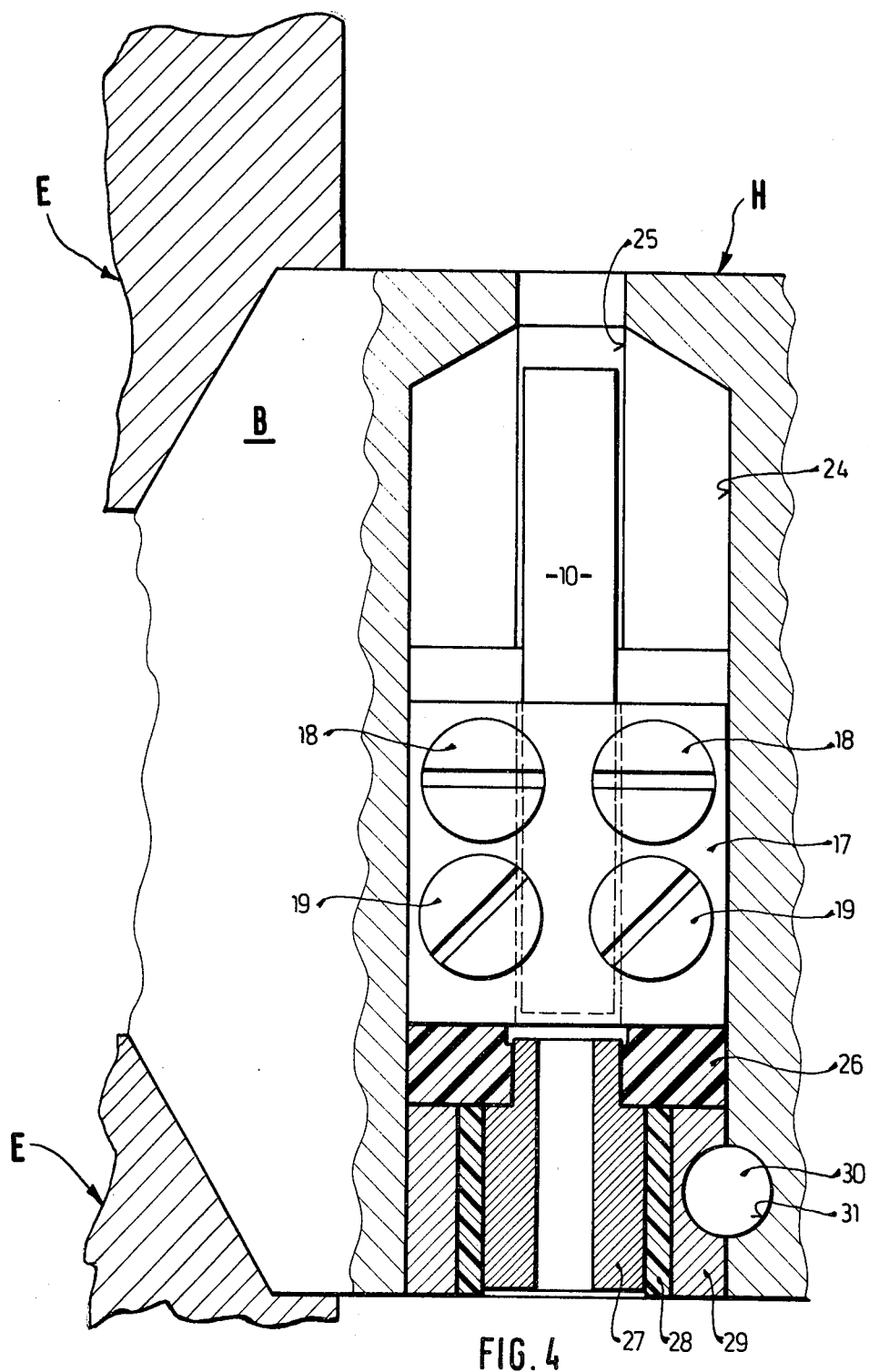
FIG. 4 is a top view of an installed sensor according to the invention.

FIG. 4 is an illustration showing how the sensor according to the invention is installed in a suitable well of a part of the engine E, only a portion of the cylinder head of which is shown. As previously noted, during the installation, care should be taken that the cantilevered element 10 is so located as to lie transverse with respect to the direction of oscillation of the part of the engine in which it is mounted. It is especially suitable to employ one of the cylinder head bolts B as the engine component in which the sensor is mounted. For this purpose, the cylinder head bolt B is provided with a transverse bore 24 as provided in FIG. 4. The cylinder head bolt which is located directly above a cylinder, is especially well placed for transmitting the oscillations occurring during engine knocking, thereby transmitting these oscillations to the sensor contained in the head of the bolt.

However, the sensor may also be advantageously placed in the transverse bore of a spacer disc which is mounted to the engine with a separate bolt.

In still another version, the sensor may also be placed directly into a special bore of the engine.

The sensor can be placed in a transverse bore of the head H of a cylindrical bolt B which is itself attached to the engine E in a suitable threaded bore (see FIG. 4).

As shown in FIG. 4, a sensor essentially as illustrated in FIG. 1 is inserted in a transverse bore 24 of the head H of cylinder head bolt B of the engine E. The base of the sensor is provided with a milled slot 25 which permits the element 10 to oscillate freely while being protected against damage when not installed. The cylindrical form of the sensor body provides a rigid contact with the receiver bore 24 of the cylinder head bolt B.

It may be advantageous to damp the oscillating piezoelectric element with a suitable viscous fluid. For this purpose, the receiver bore 24 is sealed with a seal ring 26 which is held in place by a connecting tube 27 which provides electrical connections (not shown) to the piezoelectric element 10. The connecting tube 27 is held in place by a clamping ring 29 and is separated therefrom by an intermediate plastic sleeve 28. The clamping ring 29 has substantially the same outer diameter as the inside diameter of the receiver bore 24. The clamping ring 29 may be held in the receiver bore 24 by means of a tapered pin 30 pressed into a suitable opening 31 defined by the clamping ring and the surrounding material of the bolt. When the receiver bore 24 is filled with damping fluid, it is advantageous to permit an air bubble to remain within the bore which can serve to equalize the expansions of the fluid that occur during temperature changes. The effect of the air bubble on the degree of damping is negligible inasmuch as the damping depends principally upon the width and breadth of the gap between the piezoelectric element and the opposite flat surface of the holder.

When the engine is operating, the pressure in the combustion chamber exerts loading forces on the cylinder head bolts which tend to curve its top surface. If the cylindrical body of the sensor is in contact with the entire surface of the receiver bore 24, these forces may cause a bending of the entire sensor body which would tend to rotate the clamped end of the piezoelectric element. This rotation causes a further excitation of the sensor which may be prevented by rounding off the cylindrical body of the sensor at both ends and holding it in conical receivers. In that case, only transverse motions are possible.

For some applications, the cylindrical sensor body may also be provided with a central carrier ring which fits precisely into the receiver bore 24 but which transmits only the oscillations of the central part of the cylinder head bolt to the sensor. In other respects, the attachment to the cylinder head bolt may be similar to that shown in FIG. 4, i.e., by means of a tangential tapered pin located in the vicinity of the central holding ring, for example in the vicinity of the threaded bolt portion of the cylinder head bolt.

In some instances, it may be advantageous to install a plurality of sensors according to the invention, each tuned to somewhat different frequencies, thereby providing a relatively broad band of sensitivity.

The foregoing description relates to merely exemplary embodiments and features of one of the embodiments may be used in the other as well as further embodiments may be provided within the spirit and scope of the invention.

We claim:

1. An internal combustion engine having a portion formed with a cylindrical bore (24) therein;
   an engine knock sensor located in said bore to generate an electrical signal upon the occurrence of engine knock, said sensor comprising
   an adjustable clamping device (16, 17, 18, 19; 21, 22, 23) shaped and arranged for rigid attachment to said engine within said bore,
   and a piezoelectric element (10, 12, 13) held by said clamping device in cantilevered configuration to permit substantially only bending oscillations thereof and generating electrical signals selectively in dependence on the frequency of engine oscillations, the piezoelectric element being clamped in a clamping device and tuned to preferentially vibrate at the frequency of engine knocking,
   said clamping device being fitted into the cylindrical bore and secured to the portion of the engine to receive vibrations from the engine and transmitting them to the piezoelectric element.

2. An internal combustion engine according to claim 1 wherein said cylindrical bore (24) is a transverse bore in the head (H) of a cylinder head bolt (B) and forming said portion of said engine (E).

3. Engine according to claim 2 wherein said bore (24) is filled with a damping fluid.

4. An internal combustion engine according to claim 1, wherein said clamping device (16, 17, 18, 19; 21, 22, 23) includes adjustment means for adjusting the effective oscillating length of the piezoelectric element, whereby the resonant frequency of the piezoelectric element sensor may be adjusted to the frequency defined by the engine knock.

5. For combination and assembly with an internal combustion engine (E),
a sensor for generating an electrical signal upon the occurrence of engine knock comprising
an adjustable clamping device (16, 17, 18, 19; 21, 22, 23) shaped and arranged for rigid attachment to said engine;
and a piezoelectric element (10) held by said clamping device in cantilevered configuration to permit substantially only bending oscillations thereof and generating electrial signals selectively in dependence on the frequency of engine oscillations, said clamping device comprising a U-shaped clamp and adjustment means comprising a convex surface of the interior surface of the legs of the U-shaped clamp and clamping screws (22, 23) passing through the leg of said clamping device for holding therebetween one end of said cantilevered piezoelectric element (10), said adjustment means permitting adjustment of the point of contact of said convex surfaces and the surface of said element (10) by differential tightening of said clamping screws (22, 23) to tune the cantilevered piezoelectric element to the frequency of engine knocking.

6. A sensor according to claim 5, wherein said clamping device (16, 17 18, 19; 21 22, 23) includes adjustment means for adjusting the effective oscillating length of the cantilevered element (10); whereby the resonant frequency of the cantilevered oscillating sensor (10) may be adjusted to the frequency defined by the engine knock.

7. For combination and assembly with an internal combustion engine (E),
a sensor for generating an electrical signal upon the occurrence of engine knock comprising
an adjustable clamping device (16, 17, 18, 19; 21, 22, 23) shaped and arranged for rigid attachment to said engine;
and a piezoelectric element (10) held by said clamping device in cantilevered configuration to permit substantially only bending oscillations thereof and generating electrical signals selectively in dependence on the frequency of engine oscillations, said clamping device comprising a base (16) on which is placed one end of said piezoelectric element (10);
a clamping plate (17);
and clamping screws (18, 19),
said clamping screws (18, 19) pressing said clamping plate (17) and said end of the piezoelectric element (10) against said base (16) to rigidly attach said piezoelectric element (10) to said base (16) at said one end;
the piezoelectric element being clamped in the clamping device and tuned to preferentially vibrate at the frequency of engine knocking.

8. A sensor according to claims 5 or 7, further comprising means for placing and affixing said sensor within a cylindrical receiver bore (24) in said engine.

9. A sensor according to claim 8, wherein said bore (24) is filled with a damping fluid.

10. For combination and assembly with an internal combustion engine (E) having a cylindrical receiver bore (24) therein,
a sensor for generating an electrical signal upon occurrence of engine knock comprising
an adjustable clamping device shaped and arranged for rigid attachment within said receiver bore in said engine;
and a piezoelectric element (10) held by said clamping device in cantilevered configuration to permit substantially only bending oscillations thereof and generating electrical signals selectively in dependence on the frequency of the engine oscillations, the piezoelectric element being clamped in the clamping device and tuned to preferentially vibrate at the frequency of engine knocking;
means for locating said sensor within the cylindrical receiver bore (24) of said engine;
and means securing said locating means in said receiver bore comprising a transverse bore (31) formed, in part, respectively, in said locating means and in the wall defined by said receiver bore (24), and a tapered pin (30) placed in said transverse bore to clamp said locating means in said receiver bore (24) without placing bending stresses on said locating means.

11. A sensor according to claim 10, further comprising a sealing ring (26) for sealing the interior volume of said bore (24).

12. For combination and assembly with an internal combustion engine (E), in which said engine includes an engine cylinder head bolt (B), and said bolt is formed with a bore (24) transversely thereto,
a sensor for generating an electrical signal upon occurrence of engine knock comprising
an adjustable clamping device (16, 17, 18, 19; 21, 22, 23) shaped and arranged and being fitted into said bore in the head bolt (B) to receive vibrations from the engine and transmit said vibrations to the sensor;
and a piezoelectric element (10) held by said clamping device in cantilevered configuration to permit substantially only bending oscillations thereof and generating electrical signals selectively in dependence on the frequency of engine oscillations, the piezoelectric element being clamped in the clamping device and tuned to preferentially vibrate at the frequency of engine knocking.

13. For combination and assembly with an internal combustion engine (E),
a sensor to generate an electrical signal upon occurrence of engine knock comprising
an adjustable clamping device (11; 16, 17, 18, 19; 21, 22, 23) shaped and arranged for rigid attachment to said engine and
a piezoelectric element (10) held by said clamping device in cantilevered configuration to permit substantially only bending oscillation thereof,
wherein said engine (E) is formed with a cylindrical receiver bore (24), said clamping device being shaped and arranged to fit into said bore and securing said sensor within the bore (24) in said engine.

14. Sensor according to claim 13 further including a damping fluid filled in said bore (24).

15. Sensor according to claim 13 further including a recess (31) having an axis transverse to the axis of the bore (24) in the engine,
and a tapered pin (30) in the recess and securing said sensor in the bore to clamp the holding means in the bore free from bending.

16. Sensor according to claim 13 further including a sealing ring (26) to seal the interior volume of said bore (24).

17. For combination and assembly with an internal combustion engine (E) in which said engine includes an engine cylinder head bolt (B), and said bolt is formed with a bore (24) transversely thereto, a sensor for generating an electrical signal upon the occurrence of engine knock comprising a clamping device shaped and arranged for and being fitted to said bore in the head bolt (B) to receive vibrations from the engine and transmit said vibrations to the sensor;

and a piezoelectric element (10) held by said clamping device at one end thereof in cantilevered configuration to permit substantially only bending oscillations thereof and generating electrical signals selectively in dependence on the frequency of engine oscillations;

said clamping device comprising a U-shaped member and wherein one end of said piezoelectric element (10) is adhesively attached within the legs of said U-shaped member the piezoelectric element being clamped at a position to preferentially vibrate at the frequency of engine knocking.

* * * * *